UNITED STATES PATENT OFFICE.

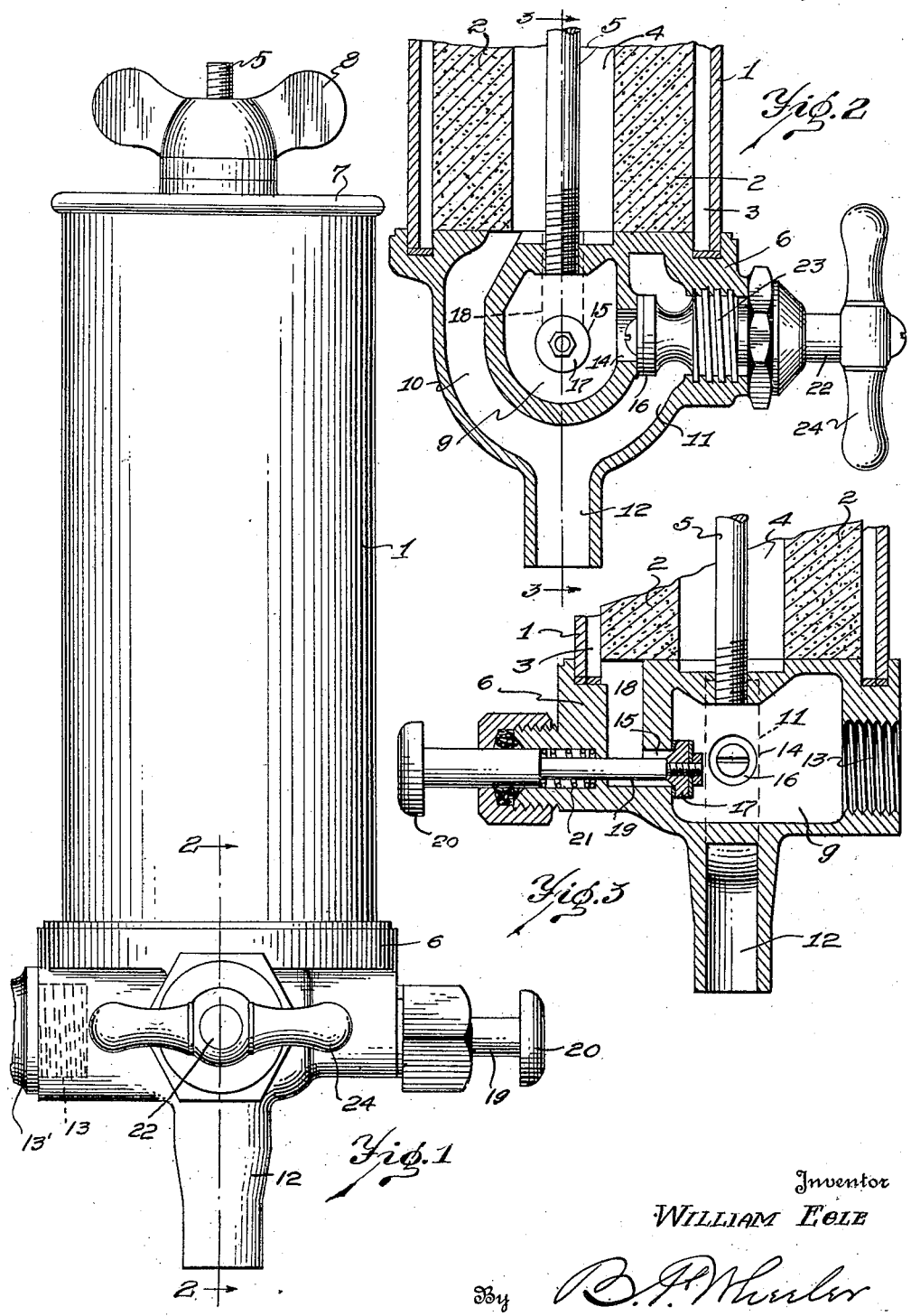

WILLIAM EGLE, OF DETROIT, MICHIGAN.

WATER FILTER.

1,401,970.　　　　Specification of Letters Patent.　　Patented Jan. 3, 1922.

Application filed August 23, 1920. Serial No. 405,282.

*To all whom it may concern:*

Be it known that I, WILLIAM EGLE, a citizen of the United States, residing at Detroit, in the county of Wayne and State of Michigan, have invented a new and useful Water Filter, of which the following is a specification.

This invention relates to water filters and more particularly to water filters designed for household use.

It is the object of the invention to provide a water filter attachable to an ordinary water faucet and having provision for effecting a flow of the water through a filtering element prior to its discharge or for discharging the water unfiltered.

The invention consists in various features of the construction and more particularly in the arrangement of water passages and control valves in the faucet-engaging base of the filter. A preferred embodiment of the invention is illustrated in the accompanying drawing, wherein, Fig. 1 is a view of the improved filter in front elevation.

Fig. 2 is a sectional view of the base portion of the filter, the section being taken upon line 2—2 of Fig. 1.

Fig. 3 is a vertical sectional view, transverse to Fig. 2, also showing the base portion of the filter.

In these views the reference character 1 designates a cylindrical casing and 2 a hollow cylindrical filtering element arranged within the casing 1. The filtering element is spaced from the casing 1, as is indicated at 3 and is formed with the central opening 4. Through the opening 4 there is centrally extended a tie-rod 5, the lower end of which is threaded into the base 6 on which said casing and filtering member are seated, while the upper end passes through a cap or cover member 7 and is engaged above said cap by a wing-nut 8. When said nut is properly tightened against the cap the latter bears firmly upon the casing and filtering element, clamping the same upon the base.

In the base 6 there is cored a central chamber 9 and passages 10 and 11 at opposite sides of said chamber, communicating centrally below said chamber with a common discharge spout 12. A water inlet port 13 extends from an exterior face of the base to the chamber 9 and is screw-threaded for engagement with a water supply pipe 13', as shown in Fig. 1. Two outlet ports, indicated at 14 and 15, are provided for the chamber 9 and are controlled respectively by valves 16 and 17. The port 14 provides for a discharge of water from the chamber 9 into the passage 11 through which said water may pass unfiltered to the discharge spout 12. (See Fig. 2). The port 15 provides for a discharge of water from the chamber 9 into a vertical passage 18 cored in the base 6, which passage opens into the annular space 3 formed between the filtering element 2 and casing 1. Thus when the valve 17 is unseated, water may pass from the chamber 9 by way of the passage 18 to the annular space 3, whence it will filter through the member 2 into the central opening 4 of said member. The passage 10, which is extended to the top face of the base 6, communicates with the central opening of the filtering element and provides for the passage of the filtered water from said opening to the discharge spout 12.

Preferably the valve 17 is of the spring-pressed plunger type, remaining open only when manually engaged, while the valve 16 is adjusted by means of screw-threads and is adapted to maintain any desired position of adjustment. Thus the valve 17 is provided with a stem 19 extending through a suitably packed bearing, exteriorly of the base 6 and having upon its outer end a knob 20, said stem being urged outwardly by a spring 21 recessed within said bearing to hold the valve normally closed upon its seat. The valve 16 is provided with a stem 22, which has an enlarged screw-threaded portion 23, engaging the base, and has upon its outer end the handle 24.

From the foregoing description it will appear that when the described filter is engaged with a water supply pipe the latter constitutes a support for the filter and is in open communication with the chamber 9, so that normally said chamber will be full of water. If a discharge of unfiltered water is desired, the handle 24 is turned until the valve 16 has been unseated to the desired extent. The unfiltered water will pass to the discharge spout 12 by way of the port 14 and passage 11. To effect a discharge of filtered water, pressure is manually applied to the knob 20, shifting the stem 19 inwardly and unseating the valve 17. This will allow a flow of water from the chamber 9 through the passage 18 to the annular space 3, thence through the filtering element 2 into the central opening 4, from which opening the filtered water will pass to the discharge spout 12 by way of the passage 10.

Thus it is seen that the invention provides means for effecting the discharge from a single spout of either filtered or unfiltered water, and provides a self-closing valve controlling the filtered water, since the same is ordinarily required only in small quantities, while the valve controlling the unfiltered water will remain in any position of adjustment for regulating the discharge of such water.

It is to be observed that the valve controlling the filtered water supply seats interiorly upon the wall of the chamber 9, while the unfiltered water valve seats exteriorly upon said wall.

What I claim is:

1. In a water filter, the combination with a filtering element having a central opening, of a casing inclosing said element and spaced therefrom, a base upon which said element and casing are secured, formed with a chamber having a water inlet threaded for engagement with a faucet, and having two outlet ports and further formed with a discharge passage leading from one of said ports, with a passage leading to one of the openings formed respectively within and around said filtering element, and with a discharge passage leading from the other of said openings, and valves respectively controlling said outlet ports.

2. In a water filter, the combination with a filtering element having a central opening, of a casing inclosing said element and spaced therefrom, a base upon which said element and casing are secured, formed with a chamber having a water inlet threaded for engaging with a faucet, and having two outlet ports and further formed with a discharge passage leading from one of said ports and with a passage leading to one of the openings formed respectively within and around said filtering element, and with a discharge passage leading from the other of said openings, said base being further formed with a common discharge spout for the two said discharge passages, and valves respectively controlling said outlet ports.

3. In a water filter, the combination with a filtering element having a central opening, of a casing inclosing said element and spaced therefrom, a base upon which said element and casing are secured, formed with a chamber having a water inlet threaded for engagement with a faucet, and having two outlet ports, and further formed with a discharge passage leading from one of said ports to a passage leading to one of the openings formed respectively within and around said filtering element, and with a discharge passage leading from the other of said openings, and valves respectively controlling said outlet ports, one of said valves being seated interiorly of said chamber and the other exteriorly thereof.

4. In a water filter, the combination with a filtering element having a central opening, of a casing inclosing said element and spaced therefrom, a base upon which said element and casing are secured, formed with a chamber having a water inlet threaded for engagement with a faucet, and having two outlet ports and further formed with a discharge passage leading from one of said ports to a passage leading to one of the openings formed respectively within and around said filtering element, and with a discharge passage leading from the other of said openings, and valves respectively controlling said outlet ports, one of said valves being self-seating and the other self retaining in any adjusted position.

5. In a water filter, the combination with a filtering element having a central opening, of a casing inclosing said element and spaced therefrom, a base upon which said element and casing are secured, formed with a central chamber having an inlet passage in open communication with a source of water supply and having two valve-controlled outlet ports communicating with passages about said chamber, one of which provides for a direct discharge from one of said ports, the other of which leads from said chamber to the space about the filtering element, and a third passage communicating with the opening of said filtering element and with said direct discharge passage.

In testimony whereof I sign this specification.

WILLIAM EGLE.